United States Patent [19]

Kume et al.

[11] Patent Number: 4,516,240
[45] Date of Patent: May 7, 1985

[54] TIME DIVISION DIGITAL SIGNAL TRANSMISSION SYSTEM WITH BLOCK PACKING

[75] Inventors: Hiroshi Kume; Yoichi Tan, both of Kanagawa, Japan

[73] Assignee: Fuji Xerox Co., Ltd., Tokyo, Japan

[21] Appl. No.: 558,235

[22] Filed: Dec. 5, 1983

[30] Foreign Application Priority Data

Dec. 3, 1982 [JP] Japan .............................. 57/211472

[51] Int. Cl.³ .............................................. H04J 3/00
[52] U.S. Cl. .................................. 370/85; 340/825.5; 370/68; 370/94
[58] Field of Search ....................... 370/60, 85, 94, 68; 340/825.5

[56] References Cited

U.S. PATENT DOCUMENTS

| | | | |
|---|---|---|---|
| 3,787,631 | 1/1974 | Lewis | 370/85 |
| 4,099,024 | 7/1978 | Boggs et al. | 370/85 |
| 4,149,144 | 4/1979 | Diefenderfer | 370/85 |
| 4,156,112 | 5/1979 | Moreland | 370/85 |
| 4,161,786 | 7/1979 | Hopkins et al. | 370/85 |
| 4,168,469 | 9/1979 | Parikh et al. | 370/85 |
| 4,199,662 | 4/1980 | Lowe, Jr. | 370/85 |
| 4,312,063 | 1/1982 | Warner | 370/68 |
| 4,313,196 | 1/1982 | Oblonsky | 370/85 |
| 4,380,761 | 4/1983 | Boggs | 370/85 |
| 4,410,983 | 10/1983 | Cope | 370/85 |

OTHER PUBLICATIONS

"Ethernet: Distributed Packet Switching for Local Computer Networks", Metcalfe et al., Communications of the ACM, vol. 19, #7, Jul. 1976.

Primary Examiner—Douglas W. Olms
Assistant Examiner—Kenneth I. Rokoff
Attorney, Agent, or Firm—Sughrue, Mion, Zinn, Macpeak & Seas

[57] ABSTRACT

A multistation digital communication network of the type wherein station packet signals are transmitted during periodically repeated block times, a plurality of blocks forming a frame, each block time repeating once per frame, the first block of a frame being the master block. Multiple, contiguous empty blocks within a single frame are produced by locating all signal carrying frame blocks and packing them one against the other beginning with the master frame, to thereby form multiple, contiguous signal carrying or used blocks beginning from and including the master block. The remainder of the frame blocks are then contiguous empty blocks capable of receiving new packet signals, several blocks in length. Each station of the multistation network is provided with circuitry for accomplishing the block packing technique and for determining the first and last contiguous empty frame blocks. This allows the station to transmit multiple block long packet signals in the contiguous, empty frame blocks produced by packing the signal carrying frame blocks into contiguous blocks.

11 Claims, 17 Drawing Figures

TIME DIVISION DIGITAL SIGNAL TRANSMISSION SYSTEM WITH BLOCK PACKING

FIELD OF THE INVENTION

This invention relates to a digital signal transmission system in which communication cables are employed and data are transmitted in a time division manner.

BACKGROUND OF THE INVENTION

A data communication network for processing data on line with communication systems combined with data processing systems was popularized in the art with the popularization of electronic computers and the development of digital signal processing techniques. With respect to small scale communication systems, such as localized communications systems for use within public offices or companies, it is known to use a packet type communication system using communication cables such as coaxial cables which are economical and reliable and exhibit high transmission efficiency.

In the packet type communication system, a bidirectional communication cable is installed in a laboratory or the like, and a number of stations (or dedicated stations) are connected to the cable. The stations transmit messages which are divided into data blocks of, for example, 1000 to 2000 bits. A header including a destination, a communication number, etc. is added to the message. In the communication system, the channel is a passive transmission medium which has no control function. The stations themselves possess all control functions. Accordingly, each station accesses a channel after confirming that the transmission path is empty, to thereby start message transmission. When packets collide with each other during transmission, the two stations suspend the transmission. The stations start the transmission of the messages again after waiting optionally selected periods of time.

In such a communication system, packets collide with each other on the same transmission path because the stations randomly start message transmissions. Accordingly, the communication system suffers from the problem that the transmission delay time is not constant. Thus, the communication system is not suitable for real time transmission in which, as in voice communication, the relation between signal transmission and signal reception is important. This difficulty may be eliminated by employing a method in which a master station is permanently established with dedicated stations making appointments for channel access. However, this method involves the following problem. Data communication is stopped whenever the master station is out of order. Therefore, the communication system is not reliable.

In order to eliminate the above-described drawback, a digital signal transmission system called "Modified Ethernet" has been proposed. In this system, a periodically repeated frame is time divided into a plurality of blocks with the dedicated stations transmitting their information packets within the time blocks. Accordingly, the dedicated stations have equal access to empty blocks. In the case where a station possesses certain blocks for a period of time required for signal transmission, the station may periodically transmit its signals each time the frame, which includes its blocks, is repeated. That is, the real time transmission can be carried out.

Figure 1:
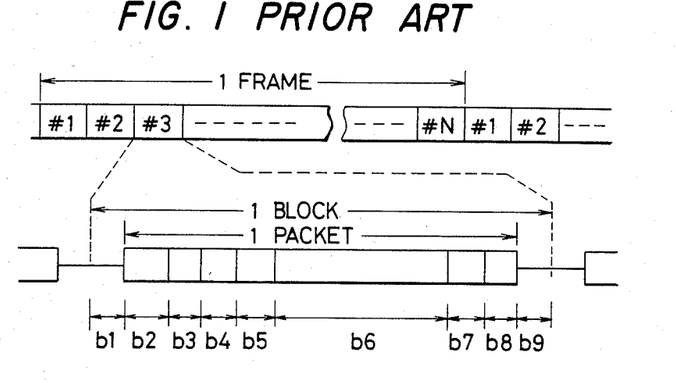
FIG. 1 is an explanatory diagram showing a frame arrangement in a communication system called "Modified Ethernet."

FIG. 1 shows a signal frame arrangement in the modified ethernet. The frame which is repeated periodically in time consists of N blocks #1 through #N. Each block consists of various bit trains $b_1$ through $b_9$ as listed below:

$b_1$: rear guard time
$b_2$: preamble
$b_3$: address bit
$b_4$: distance code bit
$b_5$: control bit
$b_6$: data bit
$b_7$: check bit
$b_8$: end flag
$b_9$: front guard time The bit trains $b_2$ through $b_5$, $b_7$ and $b_8$ are required for forming a packet and are called "overhead (additional) bits." The two bit trains $b_1$ and $b_9$ together are called "a guard time." That is, the guard time, represented by empty bit trains is provided to prevent partially overlapped of adjacent packets. There is a tendency for overlapping owing to the delay which results when bit trains are transmitted over a coaxial line. The empty bit trains are the rear guard time $b_1$ which is positioned after a packet and the front guard time $b_9$ which is positioned before a packet.

In the above-described arrangement, one block, $b_6$ forms one packet. However, there may be cases where a plurality of continuous blocks form one packet. In such a case, the packet is still arranged as just described. Such a packet can transmit a lot of data efficiently. Furthermore, the frequency of packet collisions can be reduced as compared to the case where data are transmitted with a plurality of packets.

Figure 2:
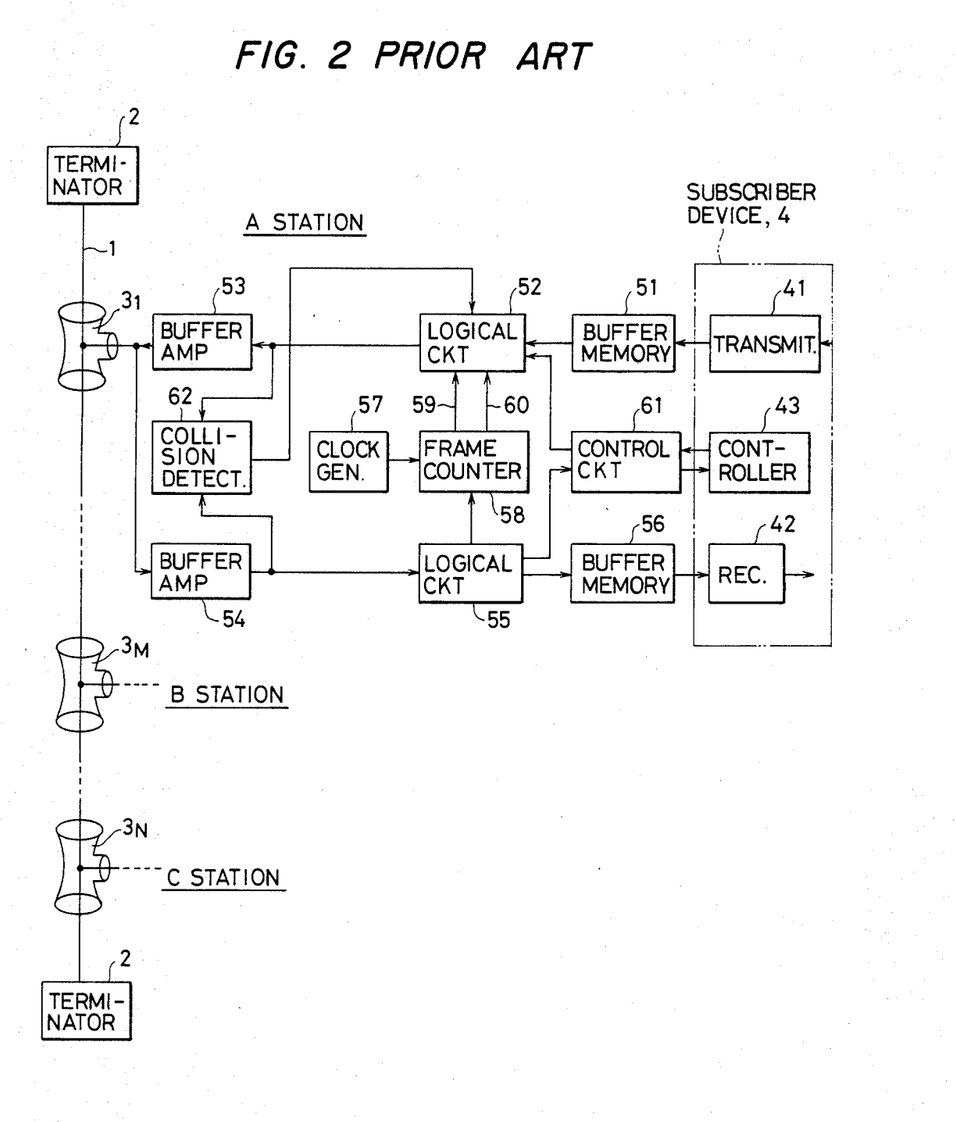
FIG. 2 is a block diagram outlining a communication system employing a conventional digital signal transmission system.

FIG. 2 outlines a modified ethernet communication system employing the above-described frame arrangement. In this communication system, a coaxial cable 1 connected as a transmission line is, at both ends, connected to impedance matching terminators 2 whose resistance is equal to the coaxial cable's characteristic impendance. Various stations are connected through T-connectors $3_1$ through $3_N$ to the coaxial 1. These stations are fundamentally all the same. Therefore, FIG. 2 shows the essential components of only station A connected to the T-connector $3_1$. Each of the other stations have like components.

Each station has a subscriber device 4 including a computer and a telephone. More specifically, the subscriber device 4 comprises a transmitter (encoder) for transmitting digital signals in packets to other stations, a receiver (decoder) for receiving digital signals in packets, and a terminal controller 43 for controlling the terminal. The output signal of the transmitter 41 is temporarily stored in a transmitting buffer memory 51 and is then read out at a predetermined time instant with a clock signal which is equal to the speed of transmission on the coaxial cable 1. The signal thus read out is converted into a predetermined packet in a transmitting logical circuit 52. The packet signal thus formed is applied through a buffer amplifier 53 and the T-connector $3_1$ to the coaxial cable 1.

All packet signals transmitted over the coaxial line 1, regardless of the orginating station, are received through the T-connector $3_1$ by a receiving buffer amplifier 54. Out of the packets thus received, the one which is destined for that station is selected by a receiving logical circuit 55 and temporarily stored in a receiving buffer memory 56. The signal thus stored is continuously read out with a predetermined clock signal. Thus, a receiving output signal has been obtained.

The transmission and reception of signals are carried out as described above. A transmission clock signal in this operation is generated by a transmission clock generator 57. A frame counter 58 frequency-divides the transmission clock signal, to form a frame timing signal 59 and a block timing signal which specify frame timing and clock timing, respectively. A transmission control circuit 61 controls the terminal controller 43 with the aid of a receiving signal from the receiving logical circuit 55, which is provided for its own station, and further controls the transmitting logical circuit 52 according to an instruction from the terminal controller 43. A collision detection circuit 62 operates to detect when a packet signal is transmitted in a block selected by that station, whether or not the packet signal collides with packets signal from other stations. The subscriber device 4 in each station is provided with a memory (not shown) for indicating the exclusive station assigned to each block in a frame, so that blocks are registered according to the packet signals of the stations which are received by the receiving buffer amplifier 54.

In the modified ethernet communication system, frame synchronization should be established in the stations. For the frame synchronization, one of the stations which is transmitting signals is designated as the leader, and will be referred to as "a master station." The master station transmits a packet signal according to the frame timing signal 59 and the block timing signal 60 which are outputted by the frame counter 58 in the master station. This packet signal is received through the coaxial cable 1 by all the stations. Upon reception of the packet signal, each station resets its own frame counter 58 with predetermined timing. Thus, the frame synchronization has been established for all the stations. In the stations other than the master station, a block timing signal is obtained from the frame counter 58 which is periodically reset, so that the block synchronization is established. The block which the master station used for transmission of the packet signal will be referred to as "a master block." When the master station is going to stop the transmission of the packet signal at a time instant, the master block may not exist in one frame. In order to avoid this difficulty, a new master station is selected in advance. The fact that the master station is replaced as described above will be referred to as "transition of the master station."

Figure 3:
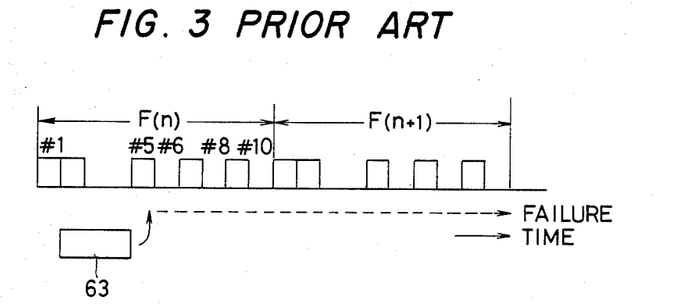
FIG. 3 is an explanatory diagram of signal carrying blocks showing an example of the failure which occurs when packets signal corresponding to several blocks is newly transmitted in the conventional digital signal transmission system.
Figure 4:
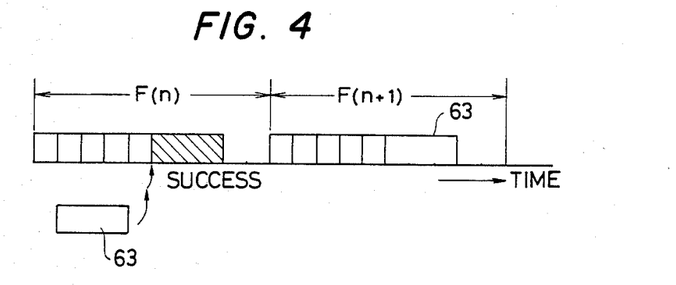
FIG. 4 is an explanatory diagram showing the signal packing which occurs when a packet signal similar to that in FIG. 3 is transmitted according to this invention.

In the communication system, a station which is about to transmit a signal searches the established frame for an empty block and loads the packet signal in the block. This will be described in more detail. FIG. 3 shows the arrangement of blocks which belong to two frames. For convenience in description, it is assumed that ten blocks #1 through #10 form one frame. Further, it is assumed that data is transmitted within the fifth block #5 in the n-th frame F(n) (n being an integer) and at this time instant a station makes a request for transmission. This station uses the memory in the subscriber device, which indicates the above-described block arrangement. If this station intends to transmit a packet signal of one block, then it can select as an empty block one of the sixth, eighth and tenth blocks #6, #8 and #10. On the other hand, if the station is to transmit a packet signal 63 of three blocks as shown in FIG. 4, continuous empty blocks are not available for the packet signal, and accordingly the packet signal 63 cannot be transmitted with the n-th frame F(n). In many cases, the block arrangement is not greatly changed even in the next frame F (n+1). That is, if only two contiguous empty blocks are available as shown in FIG. 3, then the packet signal 63 cannot be transmitted with this block.

As is apparent from the above description, in the conventional digital signal transmission system, the stations hold the blocks at random, and sometimes it takes a relatively long period of time until a packet signal over a plurality of blocks is transmitted. That is, the conventional digital signal transmission system suffers from the problem that the average waiting time (or transmission delay times) from the time instant that transmission of signals is requested until the time instant that the transmission is started becomes extensive as the length of a packet signal increases.

SUMMARY OF THE INVENTION

In view of the foregoing, an object of this invention is to provide a digital signal transmission system in which, even for a relatively long packet signal, the transmission delay time is sufficiently short.

In the invention, blocks which the stations possess individually are rearranged in the frame into a group of continuous blocks, so that empty blocks are also continuous. As a result, for instance, the arrangement of blocks shown in FIG. 3 is improved into that shown in FIG. 4, to increase the systems' ability to transmit signals such as signal 63, several packets long.

DETAILED DESCRITION OF THE PREFERED EMBODIMENT

The invention will now be described in detail with reference to its preferred embodiment.

Figure 5:
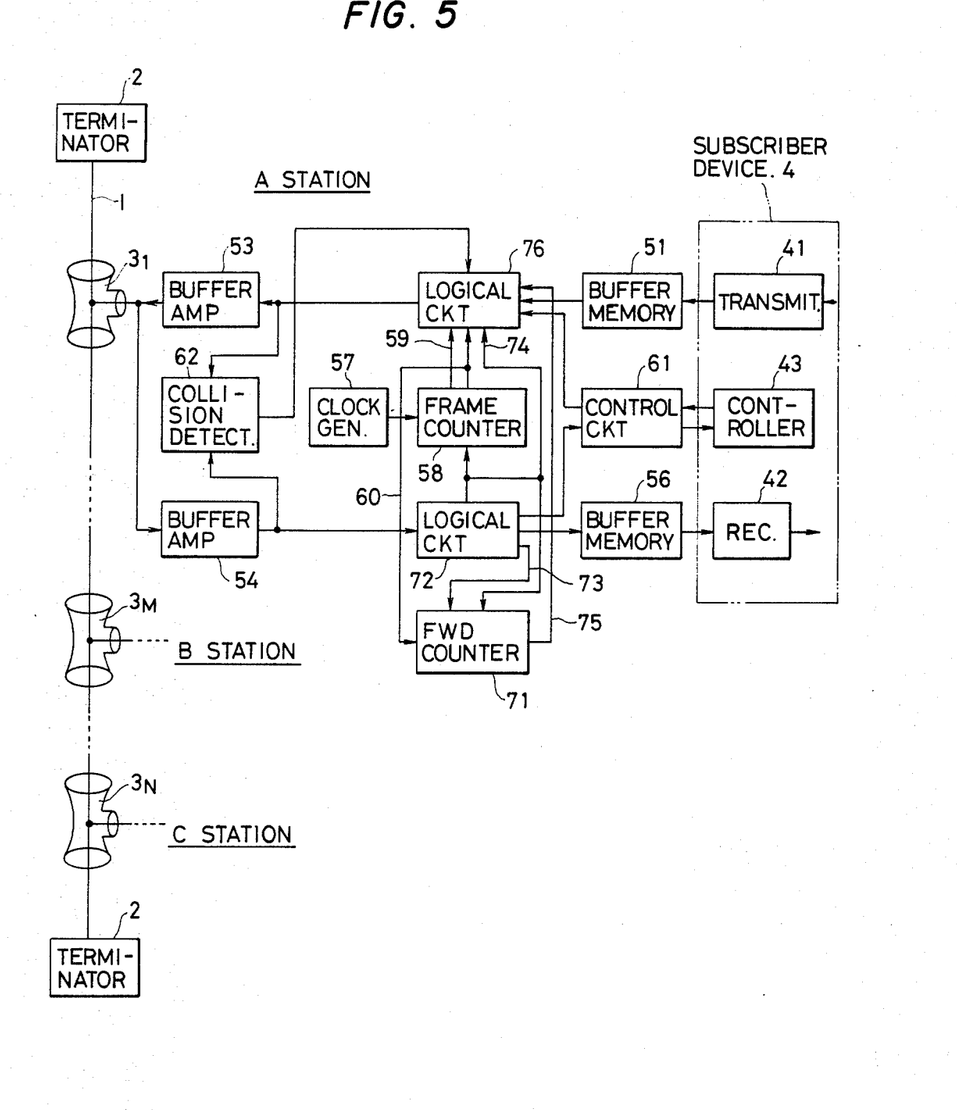
FIG. 5 is a block diagram showing a communication system employing the digital signal transmission system according to the invention.

FIG. 5 outlines a communication system which utilizes a digital signal transmission system according to the invention. In FIG. 5, those components which have been described previously with reference to FIG. 2 are similarly numbered and their detailed descriptions are omitted.

In the communication system of the invention, each station has a "forward" counter 71 which receives the block timing signal 60 from the frame counter 58, and a receiving packet signal 73 and a master block detection signal 74 from a receiving logical circuit 72. The receiving packet signal 73 is generated whenever a packet signal is received. The master block detection signal 74 is generated when the packet signal of the master signal is received and detected. The counter 71 outputs a forward count value 75 according to the signals 60, 73 and 74. The forward count value 75 is used, for instance, in the case where a packet signal transmitted by its own station is to be moved forward in the frame.

The operation of the forward counter 71 is as follows:

(1) With the aid of the block timing signal 60 and the receiving packet signal 73, the number of blocks being used is counted. That is, whenever the receiving packet singal 72 is inputted, the counter 71 increases the count value on detection of a a block timing signal 60, and outputs it as the forward count value 75. Block timing signals are generated in time coincidence with the central data portion of a signal block. That is, the block timing signal 60 is produced to coincide with the receipt of bit train 66 of the signal block illustrated in FIG. 1.

(2) The forward count value 75 is reset periodically. The resetting operation is carried out with detection of the master block. In the operation, the forward count value 75 is reset to the value "1" each time the master block is detected.

Figure 6:
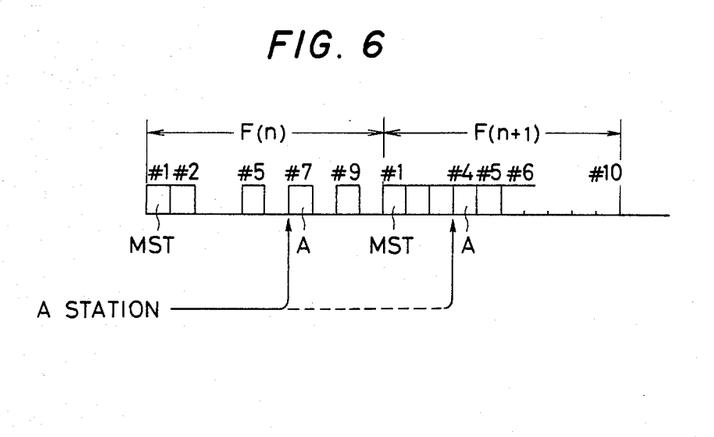
FIG. 6 is an explanatory diagram of signal carrying blocks useful in describing the block forward or block packing principle of this invention.

The count value 75 is supplied to a transmitting logical circuit 76. As an aid in understanding the transmitting logical circuit 76, the use of the forward count value 75 in the digital signal transmission system will be first described. It is assumed that, as shown in FIG. 6, a station A transmits a packet signal in the seventh block #7 in the frame F(n). The first clock #1 is the master block MST. In the frame F(n), the second, fifth, and ninth blocks #2, #5 and #9 also carry packet signals. In order that these signal carrying blocks are forwarded into the next frame F(n+1), the stations which use these blocks should transmit their packet signals with timing as if forwarded. The packet signal of the station A, which is in the seventh block #7 in the frame F(n), should be supplied with the fourth block #4 in the next frame F(n+1) to accomplish block packing. For this purpose, each station should count the number of blocks in use from the master block to the block designated for that station; including in the count the master block and the station block. In the case of the station A, the forward count value 75 is "4." Accordingly, in the next frame F(n+1), the packet signal is transmitted with the fourth block #4 by the transmitting logical circuit 76.

The forward count value 75 has an additional purpose in the transmitting logical circuit 76. When blocks in use are forwarded, the count 75 indicates the number of blocks in a frame carrying packet signals. In the (n+1)th frame f(n+1) in FIG. 6, the first through fifth blocks #1 through #5 are in use. Therefore, when a request for transmission is originated after block packing has been accomplished, the new packet signal would be transmitted in the vacant blocks (#6 through #10).

Figure 7:
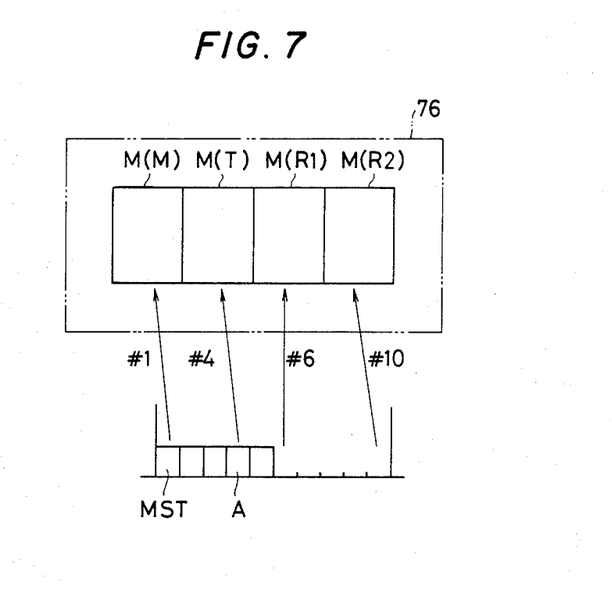
FIG. 7 is a diagram showing the relationship between four memories of the transmission logical circuit of FIG. 5.

In order to achieve the above-described operation, the logical circuit 76 has four memories M(M), M(T), M(R1) and M(R2) as shown in FIG. 7. The memory M(M) operates to store the block dedicated to the master station and thus becomes the master block. The memory M(T) operates to store the block designated for transmitting the packet signal from the memory's own station. The memories M(R1) and M(R2) operate to store the front and rear ends of continuous empty blocks, respectively. FIG. 7 shows the memories of station A and the blocks stored therein for the frame F(n+1) of FIG. 6.

The transmitting logical circuit 76 with the above-described memories operates as follows:

(1) The transmitting logical circuit 76 in the master station transmits a reference packet signal in every frame without fail. This operation of the circuit 76 of the master station is the same as the master station operation in the conventional digital signal transmission system which has been previously described herein.

(2) Each of the remaining stations (other than the master station) detects, for every frame, whether or not a master station transition has occurred. For this purpose, in each station, the block number of the master block MST is stored in the memory M(M), so that, whenever the packet signal of the master station is received, its block number is compared with the block number which has been stored. The transmitting logical circuit 76 identifies the block number with the aid of the frame timing signal and the block timing signal 60. Thus, the block number at the time instant when the master block detection signal 74 is received, identifies the block number carrying the master block MST. This block number is compared with that in the memory M(M), so that it can be readily determined whether or not master station transition has occurred.

(i) When the two block numbers areequal to each other, meaning that master station transition has not occurred, the following two calculations and operations are carried out:

1. A forward count number 75 is obtained to designate the number of blocks in use. The value in the memory M(M), is added to the forward count value 75 thus obtained. This is the value of the first empty block of a packet frame, which is block #6, in the example of FIGS. 6 and 7.

2. The value "1" is subtracted from the value of the memory M(M), and the resultant value is written into the memory M(R2). This is the value of the last empty block #10 in the case of FIGS. 6 and 7.

(ii) When the two master block numbers are not equal, i.e., the master station transistion has occurred, the above-described calculations and operations are not carried out.

(3) When master station transition has been detected and the data are written in the memories M(R1) and M(R2), the block number of the master block MST which is detected in that frame is written in the memory M(M). In the case where the master station transition is not carried out, the same number as that of the preceding frame is written; while in the case where the master station transition is carried out, the number of a new master block is written.

(4) On the other hand, the transmitting station reads the forward count value 75 in its forward counter 51 at the time instant when it starts transmission of a packet signal. The value which is obtained by subtracting the value "1" from the forward count value 75 is added to the value of the memory M(M), and the resultant value is written in the memory M(T). In the case of FIGS. 6 and 7, the packet signal of station A is transmitted in the fourth block of the frame F(n+1), and therefore the value "4" is written in the memory M(T). Thus, each station determines, when sending signals, the block number for its signal transmission in the next frame.

(5) The transmitting logical circuit 76 causes packet signal transmission in the block having a block number corresponding to the number written in the memory M(T). Thus, the packet signal is of the station A is transmitted in the fourth block, #4.

(6) On the other hand, a station which is to issue a new transmission request, makes its transmission request for a desired one of the empty blocks in the range designated by the block numbers stored in the memory M(R1) and M(R2). That is, upon reception of a transmission request signal from the transmission control circuit 61, the transmitting logical circuit 76 makes a transmission request under the condition that the number of blocks arranged for a packet signal to be transmitted is smaller than the number of arranged empty blocks.

Figure 8:
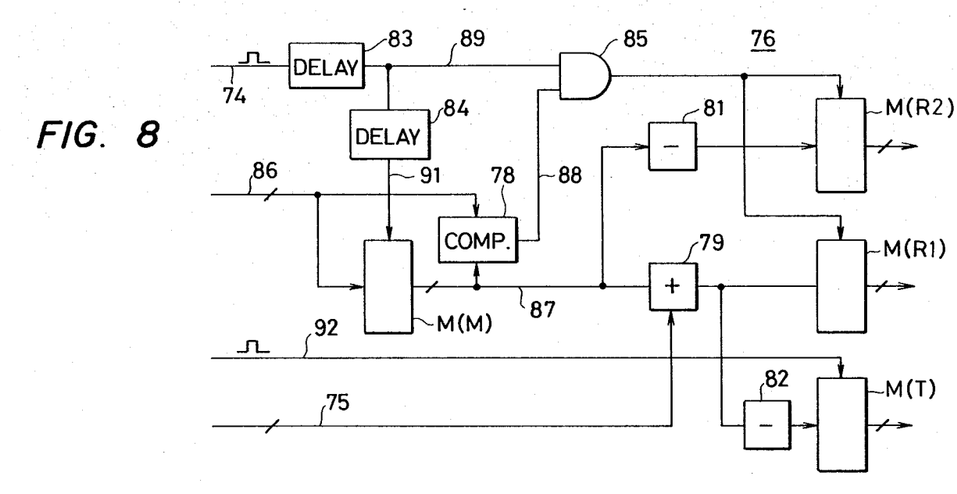
FIG. 8 is a block diagram showing the essential components of the transmission logical circuit 76 of FIG. 5.

FIG. 8 shows the essential parts of the transmitting logical circuit 76 which performs the above-described operation. The transmitting logical circuit 76 comprises, in addition to the four memories M(M), M(R1), M(R2) and M(T), a comparison circuit 78 for detecting the master station transition, an addition circuit 79 and subtraction circuits 81 and 82 for various calculations. In the circuit 76, first and second delay circuits 83 and 84 and a gate circuit 85 are used to determine reset timing for the three memories M(M), M(R1) and M(R2).

It is assumed that the packet signal from the master station is carried by the coaxial cable 1 (FIG. 1) to the stations. In this case, in each station, the receiving logical circuit 72 detects the master block from the overhead bit data, to generate the master block detection signal 74. This signal 74 is applied to the first delay circuit 83, where it is delayed. On the other hand, upon reception of the master block detection signal 74, the transmitting logical circuit 76 identifies the block number of the master block from the frame timing signal 59 and the block timing signal 60, to provide a master block number signal 86. The signal 86 is supplied to the comparison circuit 78, where it is compared with a block number signal 86 representing the preceding master block number. When these block numbers are equal, i.e., the master station transition has not occurred, a decision result signal 88 at an "H" (high) level is outputted by the comparison circuit 78. When, on the other hand, the block numbers are not equal, i.e., the master station transition has occurred, a signal at the "L" (low) level is outputted.

The signal 88 is supplied to the gate circuit 85 which is an AND circuit, where it is ANDed with the master block detection signal 74 which is outputted by the first delay circuit 83. As a result, when the master block detection signal 74 is provided under the condition that the master station transition has not occurred, the two memories M(R1) and M(R2) are reset by the master block detection signal 89 which is obtained by delaying the signal 74.

On the other hand, after the master block number comparison in the comparison circuit, the master block detection signal 91, which is further delayed, is supplied to the memory circuit M(M) from the second delay circuit 84, so that the memory M(M) is reset.

The master block's block number signal 87 which is outputted by the memory M(M) is applied to the subtraction circuit 81, in which the value "1" is subtracted therefrom. The resultant value is written in the memory M(R2), whereby the block number of the rear end one of the empty blocks is stored. The block number signal 87 is further applied to the addition circuit 79. In the addition circuit 79, the forward count value 75 is added to the block number, and the resultant value is applied to the memory M(R1) and the subtraction circuit 82. The block number of the front end one of the empty blocks is thus determined and stored in memory M(R1). In the subtraction circuit 82, the value "1" is subtracted from the value representing the output from the addition circuit 79. When the memory M(T) is reset by a packet transmission signal 92 which is generated with the timing when its own station transmits the packet signal, the above-described subtraction is written into the memory M(T), whereby the block number for the signal transmission of its own station is stored.

As is apparent from the above description, in the above-described digital signal transmission system, (1) the stations transmit signals within the earlier or "forwarded" blocks which are designated in the memory M(T); instead of in assigned or dedicated blocks; and (2) the station which is going to start transmission makes a transmission request for blocks which are in the range of block numbers stored in the two memories M(R1) and M(R2). This system is fundamentally different from the conventional transmission systems in which (1) signal transmission is always made within the same, that is, a station dedicated block and (2) signal requests are made for the empty blocks which occurs intermittently in the preceding frame. For a better understanding of the above-described differences, the digital signal transmission system of the invention will now be described under varrying circumstances.

Figure 9A:
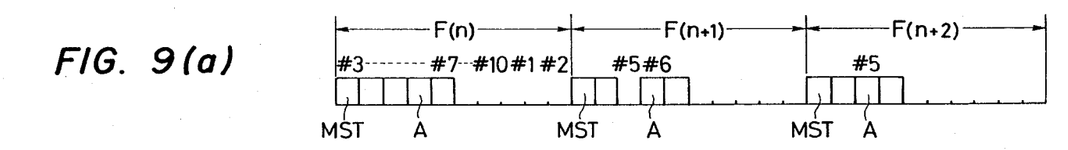
FIG. 9 is an explanatory diagram showing how, when some of the blocks are not used, other blocks are forwarded or packed.
Figure 9B:
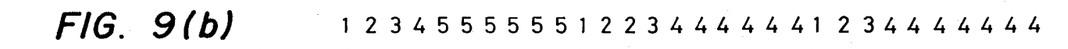
Figure 9C:
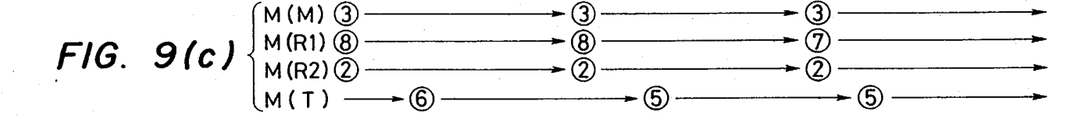

FIG. 9 shows how the block which is to be used by a particular station (or the station A in this case) is transmitted when the signal transmission of another station is ended. In a frame F(n), the third block #3 is the master block MST and the station A uses the sixth block #6 as shown in FIG. 9a. Five blocks, from the third block #3 through the seventh block #7, are being used. The count value of the forward counter in the station A is increased successively after being reset to the value "1" at the third block #3, thus being set to the value "5" at the seventh block #7, as shown in FIG. 9b, this count remains throughout the remaining portion of frame F(n). However, as shown in FIG. 9c, the block number "3" of the master block MST is written in the memory M(M), and the block numbers "8" and "2" which indicate respectively the identification of the first and last empty blocks written in the memories M(R1) and M(R2) after being determined by the calculations (3+5) and (3−1), respectively. When the station A sends the packet signal, a calculation (3+4−1) is carried out so that the block number "6" is written in the memory M(T).

It is assumed that, in the next frame F(n+1), the block #5 (which is immediately before the block #6 used by the station A) becomes empty upon completion of a signal transmission. The forward counter suspends its counting operation at the empty block #5. Accordingly, the forward count value at the block #6 used by the station A is reduced to the value "3" as indicated in FIG. 9b. As a result, the value to be written in the memory M(T) of the station A is reduced to "5." In the next frame F(n+2), the station A sends the packet signal with the block #5 which corresponds to the value stored in the memory M(T). If use of the other blocks are maintained unchanged, at this time instant, the value "5" is written in the memory M(T). The identification of the block being used by the station A is forwarded in this manner. In the forwarding, the front end of an empty block is shifted once. Accordingly, instead of the value "8," the value "7" is written in the memory M(R1) in the frame F(n+2).

Figures 10A, 10B:
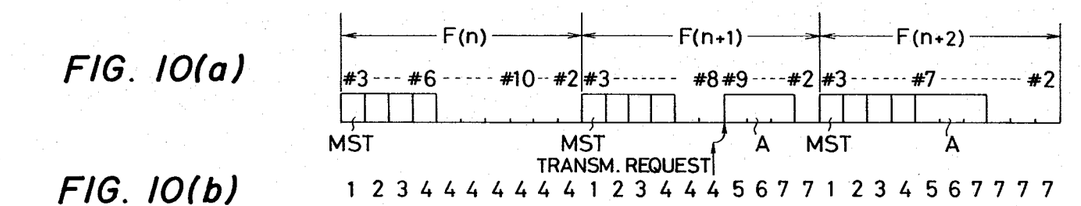
FIGS. 10a–10c are diagrams showing an example of the case where a transmission request is accepted.
Figure 10C:
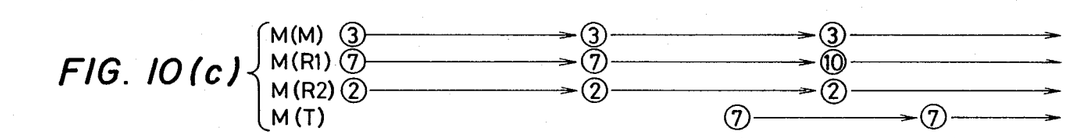

FIG. 10 shows the case where the transmission request is issued by the station A and is satisfied. In a frame F(n) immediately before the station A makes a transmission request, the third block #3 is the master block MST and the blocks #3 through #6 are being used, as shown in FIG. 10a. In this case, the contents of the forward counter of the station A are as indicated in FIG. 10b. On the other hand, the contents of the three memories M(M), M(R1) and M(R2) are as indicated in FIG. 10c. In the frame F(n), the station A sends no signals, and accordingly no value is written in the memory M(T). See FIG. 10c.

It is assumed that station A receives a transmission request signal from its transmission control circuit in the time zone which is assigned to the eighth block #8 in the next frame F(n+1). The station A detects the values of the memories M(R1) and M(R20. In this case, these values are "7" and "2;" that is, the blocks #7 to #2 are empty. When a packet signal to be sent by the station A has a length of three blocks, the station A, judging that the signal can be transmitted from the ninth block #9, applies the transmission request to the block #9. It goes without saying that the station can apply the transmission request to the block #10. As a result of the calculations (3+5−1), the value "7" is written in the memory M(T) in the station A. Therefore, in the next frame F(n+2), the packet signal of the station A is sent from the seventh block #7. The using block is forwarded in this manner. Upon arrival of the master block MST in the frame F(n+2), the count value of the forward counter becomes "7," being increased by "3," Accordingly, in the frame F(n+3), the value "10" is written in the memory M(R1), whereby the stations detect that the blocks #10 to #2 are empty.

Figure 11A:
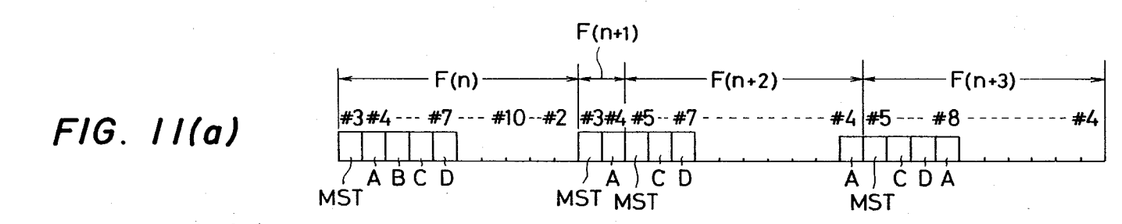
FIGS. 11a–11c diagrams showing how a master station transition is carried out.
Figure 11B:
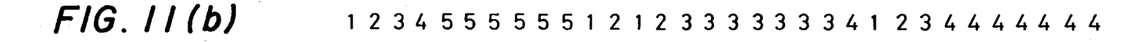
Figure 11C:
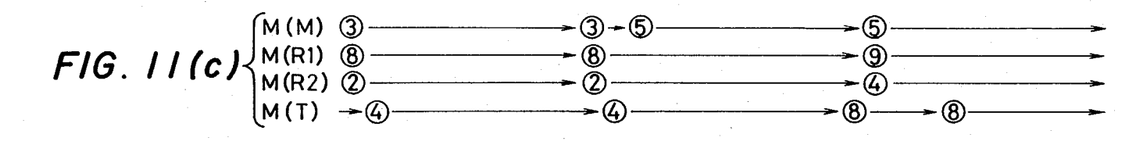

FIG. 11 shows one example of the master station transition. As shown in FIG. 11a, in the frame F(n) the third block #3 is the master block and the fourth, fifth, sixth and seventh blocks #4, #5, #6 and #7 are used by the stations A, B, C and D, respectively. FIG. 11b shows the contents of the forward counter, and FIG. 11c the contents of the memories. When a station which has sent the packet signal with the block #3 ends the transmission in the next frame F(n+1), the next master station is selected. It is assumed that the next master station thus selected is the station B. The frame F(n+1) ends at the fourth block #4 which is immediately before the block #5 which belongs to the station B. Accordingly, the next frame F(n+2) starts from the block #5 which is the new master station block. At the block #6, the forward counter is reset to "1," and the number "5" of the new master block is written in the memory M(M). As the frame F(n+2) starts from the fifth block #5, it ends at the fourth block #4. When the station A transmits signals within block #4, the value "8" is written in the memory M(T). Accordingly, in the next frame F(n+3), the station A sends a signal within the eight block #8. Thus, the forwarding has been accomplished.

An example of the digital signal transmission system according to the invention has been described in detail. However, it should be noted that it can be modified in various manners. First, it is not always necessary to limit the reset value of the forward counter to the value "1." That is, it may be the value "0," or the number of the master block. In the case where the reset value is limited to such a value, the same effect can be obtained when the values which are to be written in the memories M(R1) and M(R2) are changed in agreement with the reset value of the forward counter.

The forward counter, which is a special counter, may be omitted. That is, the possession-detecting memory which is provided in the subscriber device of each station may be used to count the number of blocks in use up to the block which is used for its own station to transmit signals, or the total number of blocks which are in use in a frame.

As is apparent from the above description, according to the invention, discontinuous blocks in a frame which are used by various stations respectively are arranged into continuous blocks, and accordingly empty blocks appear in a continuous stream. Accordingly, even when a relatively long packet signal is to be transmitted, the possibility that the transmission request can be accepted is immediately high, thus preventing increase in transmission delay time.

What is claimed:

1. In a multiple station communication network in which a station produced digital signal, transmitted over a communication cable, is fixedly positioned in a frame which is repeated periodically in time and is composed of a plurality of time blocks, the digital signals from the stations being transmitted in assigned time blocks, the first block in a frame being the master block which carries a master station generated digital signal as a frame synchronization reference signal, the stations being connected through taps to said communication cable whereby digital signals are transmitted in a time division manner, the improvement comprising:
    means for determining during each frame, the blocks which carry station produced digital signals, and
    means for rearranging the digital signal carrying blocks such that all digital signal carrying blocks in a frame are arranged in a single group of contiguous blocks.

2. A digital signal transmission system as claimed in claim 1, wherein each station of said multistation network includes;
    means, responsive to transmission by the station of digital signals in a time block, for counting the number of digital signal carrying blocks in the frame including the master block, occurring before the block carrying the station's transmission, and
    means for transmitting the station's digital signal during the next frame in the block position determined by adding one to the number determined by said counting means.

3. A digital signal transmission system as claimed in claim 2, wherein each station of said multistation network, for initiating a new transmission, includes means for counting the number of signal occupied blocks, including the master block, in the frame occurring immediately before the frame in which the station is going to initiate a signal transmission, and means for applying a signal during the frame in which signal transmission is to take place to the block of that frame occurring immediately after the block determined by counting the number of signal occupied blocks in the preceding frame.

4. A digital signal transmission system as claimed in claim 2, further including a counter to count the number of blocks which are being used and means for resetting the counter to a predetermined value upon detection of a master block.

5. A digital signal transmission system as claimed in claim 3, further including at each station,
first memory means for storing the block number corresponding to the frame block during which the station's last transmission occurred,
second memory means for storing the master station block number,
first arithmetic means for summing a signal corresponding to the master block number with the signal from said counting means counting the number of signal occupied blocks in a frame to produce a signal determining the first empty block of a frame with all transmissions in a frame taking place in contiguous blocks.

6. A digital signal transmission system as claimed in claim 5, wherein each station further includes,
third memory means for storing the summing signal from said first arithmetic means,
second arithmetic means for producing a signal corresponding to one less than the master block number, and
fourth memory means for storing the signal from said second arithmetic means.

7. In a multistation digital communication network of the type wherein each station transmits its data signals during periodically repeated block times, a plurality of blocks, 1 . . . n, forming a frame, the period of a block being the frame interval, the improvement comprising;
means for counting the number of data signal carrying blocks in a frame,
means for rearranging the block times in which data signals are transmitted in succeeding frames such that a data signal in a previously counted data signal carrying block is transmitted in a block time determined by adding the number one to the total number of data signal carrying blocks in the frame occurring before the block carrying said data signal, to thereby eliminate empty frame blocks between signal carrying blocks and produce a frame in which all signal carrying blocks are contiguous.

8. In a multistation digital communication network as claimed in claim 7, further including;
means for determining the first empty frame block after the contiguous signal carrying blocks, and
means for determining the last empty frame block of the frame to thereby produce a designation of the contiguous empty blocks in a frame,
whereby a station beginning transmission can transmit data signals several blocks in length in the contiguous empty blocks of the frame.

9. In the multistation digital communication network of claim 7, wherein each station is assigned a master time block designated by a master block number from said frame blocks 1 . . . n, said communications network including means for selecting one of said stations as a master station, said master station transmitting data signals in its master block, the master block becoming the first block of a frame, further comprising, at each station of the multistation communication network;
means for detecting in a frame all occupied blocks occurring before the station's own occupied block to determine the number of data carrying blocks in the frame up to and including the station's own block,
first memory means for storing the master block number,
second memory means for storing the time block number corresponding to the time block in which the station transmits its own signal,
first arithmetic means for producing a signal corresponding to the sum obtained by adding the master block number to the number corresponding to the number of data signal carrying blocks produced by said detecting means,
second arithmetic means for diminishing the sum signal produced by the first arithmetic means by one to produce a signal indicative of the block number in which the station's data signal is to be transmitted in the next frame.

10. In the multistation digital communication network of claim 9, further comprising;
third arithmetic means for subtracting the number one from the master block number to produce a signal indicating the last empty block in a frame, and
third memory means for storing the block number signal produced by said third arithmetic means.

11. In the multistation digital communication network of claim 10, further including comparator means for comparing the master time block number stored in said first memory with the master time block number of a received master station signal, and means for replacing the stored master time block number with the received master time block number in said first memory means if said comparator means does not indicate a match.

* * * * *